(No Model.)
W. B. BENHAM.
WATER FILTER.
No. 498,967. Patented June 6, 1893.
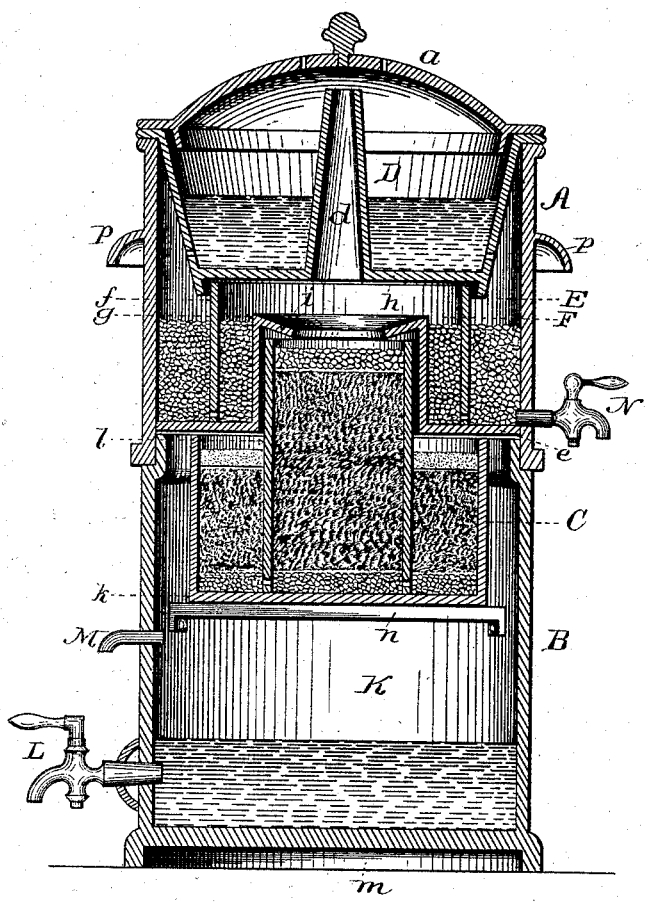
Witnesses:
W. B. Benham, Inventor:

UNITED STATES PATENT OFFICE.

WILLIAM B. BENHAM, OF WASHINGTON, DISTRICT OF COLUMBIA.

WATER-FILTER.

SPECIFICATION forming part of Letters Patent No. 498,967, dated June 6, 1893.

Application filed July 20, 1892. Serial No. 440,640. (No model.)

*To all whom it may concern:*

Be it known that I, WILLIAM B. BENHAM, of Washington, District of Columbia, have invented new and useful Improvements in Water-Filters, of which the following is a specification, reference being had to the accompanying drawing.

My invention relates to water filters, and consists in the peculiar construction and arrangement of the several parts of the device which will be more fully hereinafter described and definitely pointed out in the claims.

The object of my invention is to provide a device for the filtration and consequent purification of water or other fluids without the aid of rubber packing, sponges or other similar destructible material, and also to have every compartment easily accessible for cleansing and replenishing the filtering material. I attain this object by the device illustrated in the accompanying drawing.

The drawing represents a vertical longitudinal section of my improved water filter.

The several parts of this device are made of galvanized sheet-iron or other suitable metal.

The top receptacle A is provided with a lid or cover $a$ which fits into the top of the receiving pan or reservoir D by a suitable flange or rim and is provided with a circle of perforations in the top which serves for purposes of ventilation. Receptacle A has only so much bottom $e$ as to form a bottom for compartments E and F, the same being a short distance above the lower edge of the receptacle, thus permitting the top of receptacle B to fit inside to form a joint, so that when both receptacles are in their proper positions the bottom of receptacle A rests upon the upper edge of receptacle B. The bottom of receptacle A thus formed leaves a circular opening in the center sufficient to admit the upper portion of the charcoal compartment C hereinafter more fully described.

Receptacle A contains the receiving pan or reservoir D which has inclined sides and is provided with a flange at its upper edge, that is of the same diameter as and rests upon the top of receptacle A. The bottom of the receiving pan is situated about an inch above the lower edge of the sides of the pan. The sides of the pan D are perforated a short distance above the bottom in order to permit or cause the unfiltered fluid after passing through the perforated sides to drip into compartment E upon the gravel therein contained. A conical shaped ventilating tube $d$ is placed in the center of the pan D and communicates through the bottom $h$ with the space above the charcoal compartment C. Its upper orifice is about an inch in diameter and extends from the bottom of the receiving pan to within about half an inch of the upper edge of the lid.

Receptacle A also contains the sand and gravel compartments E and F. Compartment E is formed by the side of the receptacle and the loose or detached cylinder $f$ which is bottomless and is perforated on the sides a short distance from the lower edge and is of a diameter sufficient to equally divide the space between the side of the receptacle and the flange-cylinder $g$ and of a height nearly equal to the distance between the bottom of receptacle A and the bottom of the receiving pan D. This loose cylinder is not attached to the bottom of the receptacle and may be removed in order that the compartments which it separates can be more readily cleansed or replenished with filtering material. The flange-cylinder $g$ is attached to the bottom of receptacle A and in conjunction with the loose cylinder forms compartment F. It is about two-thirds of the height of the detached cylinder and is provided with a flange or rim $i$ on its upper edge about an inch and a half wide and slopes downward toward the top of charcoal compartment C.

Receptacle B is a cylinder of like dimensions as those of receptacle A and contains the charcoal compartment C which is of a less diameter than the receptacle and is provided with a bottom $k$ attached to which is a cylinder $l$ of a height nearly equal to the distance from the bottom $k$ to the upper edge of flange-cylinder $g$ its diameter being slightly less than that of $g'$ to permit of its telescoping inside of the latter, when in its proper place, so that its upper edge comes in contact with the under side of the flange $i$ and is perforated a short distance from the lower edge.

Receptacle B has a complete bottom $m$ situated a short distance above its lower edge. It contains two short horizontal bars $n\,n$ of a non corrosive material secured to its sides, upon which rests the pan or compartment C. These bars are situated parallel to each other and at such a distance below the upper edge of receptacle B that when the charcoal compartment is in its proper place the upper edge of the outer cylinder is a short distance below the upper edge of receptacle B while the smaller cylinder $l$ telescopes within the flange cylinder $g$.

The lower portion K of receptacle B is a storage reservoir for the fluid or liquid which passes through the filtering chambers D. E F and C. This compartment is provided with a drain-cock L which is used to convey the filtered liquid as required for use.

An overflow tube M is situated a short distance below the bars $n\ n$ and slightly to one side of the drain-cock L which permits the excessive filtered fluid to discharge in a vessel placed on the floor beneath. Its inner orifice is provided with a fine wire-gauze sieve to exclude insects and admit of ventilation.

The drain-cock N is used when it is desired to cleanse the gravel and flush out the sediment in compartments E and F.

The operation of my improved water-filter is as follows: The lid is removed and the water put into the receiving pan. The water passes out of the receiving pan through the perforations in the sides near the bottom, which perforations remove the coarser impurities contained in the liquid, drips into the gravel compartment E passing downward and through the perforations in the detached or loose cylinder into the sand compartment F, thence upward and through the filtering medium of that compartment and flows over the top of the flange-cylinder $g$ into the charcoal compartment C, thence downward through a layer of coarse sand and the charcoal and through the perforations in the inner charcoal cylinder near its lower edge, thence upward through the charcoal in the outer chamber, and through a layer of fine gravel or coarse sand, resting immediately on top of the charcoal in the latter compartment and drips into the storage reservoir K.

Any person can cleanse and replenish this filter with filtering material, there being no cemented or soldered joints to unseal, requiring the aid of a skilled person and this is one of the principal advantages in its construction. The cleansing operation is as follows: Lift receptacle A off from receptacle B by the handles $p, p$ provided for the purpose, remove the lid next taking out the receiving pan and loose cylinder, when every part of the receptacle and its contents are exposed; next lift out the charcoal compartment from receptacle B when its parts are readily accessible for cleansing and replenishing.

It is obvious that this filter could be used for filtering other liquids as well as water and that many minor mechanical changes in construction could be substituted for those shown without in the least departing from the nature and principle of my invention.

Having thus described my invention, what I claim as new, and desire to secure by Letters Patent, is—

1. In a filter, the combination with a lower receptacle for filtered water, of an upper receptacle, loosely resting thereon, containing suitable chambers, for filtering material and unfiltered water and provided with ventilating passages and apertures and having a central aperture in its bottom surmounted by a downwardly sloping flange forming the outlet therefrom; an auxiliary receptacle containing filtering material supported within the lower receptacle and having an upwardly projecting portion passing into the outlet passage from the upper receptacle substantially as described.

2. In a filter the combination with a lower receptacle for filtered water of an upper receptacle loosely resting thereon, containing suitable chambers for filtering material and unfiltered water, the chamber for unfiltered water provided with an air tube and a cover having an air passage at one side of the mouth of said air tube and said upper receptacle, having a central aperture in its bottom provided with vertical walls surmounted by a downwardly sloping flange forming the outlet therefrom, an auxiliary receptacle containing filtering material, supported within the lower receptacle and having an upwardly projecting portion passing into the outlet from the upper receptacle, said lower receptacle provided with an overflow tube opening thereinto below the bottom of said auxiliary filtering receptacle, substantially as described.

In testimony whereof I affix my signature in the presence of two witnesses.

WILLIAM B. BENHAM.

Witnesses:
WM. F. BROWN,
WM. H. DE LACY.